US008922056B2

(12) United States Patent
Thisted

(10) Patent No.: US 8,922,056 B2
(45) Date of Patent: Dec. 30, 2014

(54) POWER INTERCHANGE SYSTEM FOR INTERCHANGING ELECTRIC ENERGY BETWEEN A BATTERY AND AN ELECTRIC GRID, METHOD FOR INTERCHANGING ELECTRIC ENERGY BETWEEN A BATTERY AND AN ELECTRIC GRID AND APPLICATION OF THE POWER INTERCHANGE SYSTEM

(75) Inventor: Jan Thisted, Tjele (DK)

(73) Assignee: Siemens Aktiengesellschaft, Munich (DE)

( * ) Notice: Subject to any disclaimer, the term of this patent is extended or adjusted under 35 U.S.C. 154(b) by 637 days.

(21) Appl. No.: 13/094,050

(22) Filed: Apr. 26, 2011

(65) Prior Publication Data

US 2011/0266871 A1 Nov. 3, 2011

(30) Foreign Application Priority Data

May 3, 2010 (EP) .................................... 10161747

(51) Int. Cl.
H02J 3/32 (2006.01)
H02J 7/34 (2006.01)
B60L 11/18 (2006.01)

(52) U.S. Cl.
CPC ............... H02J 7/34 (2013.01); B60L 11/1842 (2013.01); Y02T 10/7088 (2013.01); Y02T 10/7005 (2013.01); Y02T 90/163 (2013.01); Y02T 90/14 (2013.01); Y02T 90/128 (2013.01); Y04S 10/126 (2013.01); Y02E 60/721 (2013.01)
USPC ................... 307/46; 307/18; 307/19; 307/43; 307/64; 307/66; 307/9.1; 307/29; 307/86; 320/109; 700/101

(58) Field of Classification Search
USPC ............ 307/45, 46, 47, 66; 320/109; 700/101
See application file for complete search history.

(56) References Cited

U.S. PATENT DOCUMENTS

| 2003/0132742 A1* | 7/2003 | Harding et al. ................ 324/110 |
| 2004/0095230 A1* | 5/2004 | Li et al. ..................... 340/426.16 |
| 2006/0125421 A1* | 6/2006 | Costa .............................. 315/294 |
| 2006/0219448 A1* | 10/2006 | Grieve et al. .................. 180/65.3 |
| 2007/0005192 A1* | 1/2007 | Schoettle et al. ............. 700/286 |
| 2007/0276547 A1* | 11/2007 | Miller ........................... 700/295 |
| 2007/0282495 A1 | 12/2007 | Kempton et al. |
| 2008/0040295 A1* | 2/2008 | Kaplan et al. .................. 705/412 |
| 2008/0114499 A1* | 5/2008 | Hakim et al. .................. 700/291 |
| 2008/0167756 A1* | 7/2008 | Golden et al. ................. 700/297 |
| 2011/0004358 A1* | 1/2011 | Pollack et al. ................ 700/297 |
| 2012/0059527 A1* | 3/2012 | Beaston et al. ............... 700/295 |

FOREIGN PATENT DOCUMENTS

| CN | 201290010 Y | 8/2009 |
| WO | WO 2009052451 A2 | 4/2009 |

* cited by examiner

Primary Examiner — Jared Fureman
Assistant Examiner — Carlos Laguerre

(57) ABSTRACT

A power interchange system for interchanging electric energy between a battery and an electric grid is provided The power interchange system includes a rectifier unit for converting alternating current of the electric grid into direct current for charging the battery; a grid measurement device for measuring an electric parameter of the electric grid, and a controller unit for adjusting the direct current for the charging the battery as a function of the electric parameter of the electric grid. Moreover a method for interchanging electric energy between a battery and an electric grid is provided.

19 Claims, 1 Drawing Sheet

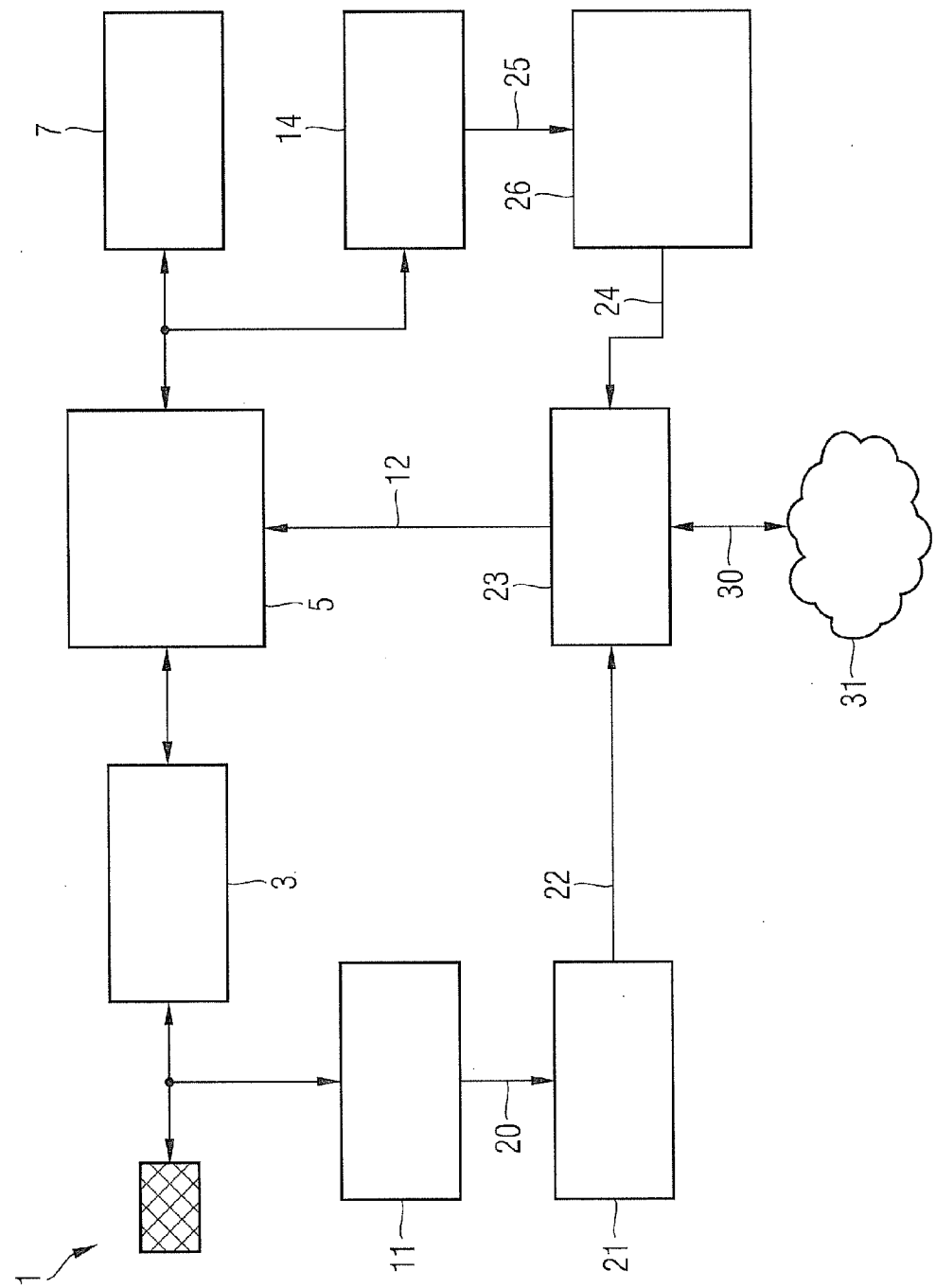

POWER INTERCHANGE SYSTEM FOR INTERCHANGING ELECTRIC ENERGY BETWEEN A BATTERY AND AN ELECTRIC GRID, METHOD FOR INTERCHANGING ELECTRIC ENERGY BETWEEN A BATTERY AND AN ELECTRIC GRID AND APPLICATION OF THE POWER INTERCHANGE SYSTEM

CROSS REFERENCE TO RELATED APPLICATIONS

This application claims priority of European Patent Office application No. 10161747.0 EP filed May 3, 2010, which is incorporated by reference herein in its entirety.

FIELD OF THE INVENTION

This invention relates to a power interchange system for interchanging electric energy between a battery and an electric grid, a method for interchanging electric energy between a battery and an electric grid and an application of the power interchange system.

BACKGROUND OF THE INVENTION

For example, the power interchange system for interchanging electric energy between a battery and an electric grid is a battery charger for electrical cars.

A car battery charger for electrical cars generally includes a single or three phase grid transformer, a rectifier unit for converting alternating current into direct current for charging the battery and an electronic control for controlling the direct current for the charging the battery.

SUMMARY OF THE INVENTION

It is an object of the invention to provide a high efficient and reliable power interchange system for interchanging electric energy between a battery and an electric grid.

Another object of the invention is the providing of a highly efficient and highly reliable method for interchanging electric energy between a battery and an electric grid.

These objects are achieved by the inventions specified in the claims.

The idea behind the invention is a control of the charging current of a battery as a function of an electrical status of the electrical grid providing the charging current.

The present invention provides a power interchange system for interchanging electric energy between a battery and an electric grid. The interchange system comprises: A rectifier unit for converting alternating current of the electric grid into direct current for charging the battery; a grid measurement device for measuring an electric parameter of the electric grid; and a controller unit for adjusting the direct current for the charging the battery as a function of the electric parameter of the electric grid.

Additionally the present invention provides a method for interchanging electric energy between a battery and an electric grid by operating the power interchange system. The method comprises: a) Providing the power interchange system, the battery and an electric grid, wherein the battery and the electric grid are interconnected such, that electric energy can be interchanged between the battery and the electric grid; b) Measuring the electric parameter of the electric grid by the grid measurement device of the power interchange system; c) Adjusting the direct current for charging the battery as a function of the parameter of the electric grid by the controller unit of the power interchange system; d) Converting alternating current of the electric grid into the direct current for charging the battery; and d) Charging the battery by the direct current.

Moreover an application of the power interchange system for charging a battery is disclosed. All kind of rechargeable batteries are possible. Preferably the battery is selected from the group consisting of battery for a vehicle, flow battery and electrochemical battery. With the aid of the power interchange system these kinds of batteries can be charged.

The measuring of the electric parameter of the electric grid can be executed before the charging the battery. But a simultaneously measuring and charging is preferred. Simultaneously measuring and charging mean, that the measuring occurs while the charging. This has the advantage, that the charging current can be immediately adjusted to changes of the status of the electric grid. This is related to the adjusting and to the converting, too. Therefore, in a preferred embodiment the measuring, the adjusting, the converting and/or the charging are executed simultaneously.

At least one kind of electric parameter of the grid is determined. Two or more electric parameters of the grid can be detected, too. Based on the electric parameter or parameters the charging of the battery is carried out. The electric parameter of the electric grid is selected from the group consisting of current, voltage and frequency of the electric grid.

In a preferred embodiment of the invention the controller unit is configured such, that a predefined (predetermined) direct current for charging or discharging the battery is provided as a function of the electric parameter. For example, the electric parameter is a voltage of the electric grid. The controller unit is configured to provide a predefined response (predefined adjusting the direct current for the charging the battery) in the case of a voltage drop of the electric grid.

Preferably the controller unit is configured such, that a local power grid disturbance within the electric grid can be detected and/or power grid support can be provided. The disturbance can be repaired. Alternatively the adjustment of the charging the battery is accomplished.

The power interchange system comprises a main current circuit, which is selected from the group consisting of single phase circuit, two phase circuit and three phase circuit. The main circuit is a main part of the power interchange system.

In an additional preferred embodiment the power interchange system comprises an inverter unit for converting direct current of the battery into alternating current for supplying the electric grid with the alternating current. Direct current originated from the battery can be inverted and transmitted to the electric grid. A discharging of the battery occurs. The battery has the function of a power source for the electric grid.

The measuring and/or the adjusting can be executed by wire-bound communication. Preferably wireless communication between the electric grid operator and the controller unit is executed. Therefore, in a further preferred embodiment power interchange system can be monitored and/or controlled from a remote location e.g. a grid operator control center.

There can be just one interchange system. As to an amount of interchanged electric power a plurality of the described power interchange systems operable in parallel are advantageous. Therefore concerning an additional facet of the invention an arrangement of at least two of the power interchange systems is provided, wherein the power interchange systems can be operated in parallel.

A combined car battery charger and grid inverter generally includes a single or three phase grid transformer, a power electric device with four quadrant operation capability, which includes active power import/export and reactive power import/export between the car battery and the power grid. A combined car battery charger and grid inverter also includes electronic control of charging and discharging of the car battery.

In the future the whole structure and control of the power grid is likely to change. A significant amount of the generation capacity based on central power stations with large synchronous generators is likely to be replaced by distributed generating units like wind power, wave power, solar power and small generating units based on biomass. The frequency balance and voltage control on the grid has traditionally been carried out by the large central generating units that have been fitted with control systems to ensure a stable power frequency and voltage.

Traditionally central power stations have been based on fossil fuel like coal, gas or oil. As the available sources of fossil fuel is limited and the emission of $CO_2$ from the fossil fuel based power production is of serious concern for the impact on the global climate, more sustainable power generation systems are going to be connected to the utility grid systems in the future. This change in the power generation systems will require a re-thinking of the way the whole power grid is kept in balance.

So called "Smart Grid" solutions are being developed as a way of securing the active and reactive power balance on the utility grid when many distributed renewable energy generating units have replaced the big central units.

In a Smart Grid not only the generating units but also some power consumers shall act to maintain the balance on the power grid. Furthermore an electrical energy storage capacity is very important in order to store energy when the power generation exceeds the power consumption and in order to release energy when the power consumption exceeds the power generation.

In a Smart Grid both generating units and at least apart of the electricity consuming units shall participate in keeping the power grid stable and in balance. The most important features for the generating units are frequency control, voltage or reactive power control and the capability to stay connected to the grid even during short voltage dips (fault ride through capability).

A very important element in an advanced Smart Grid solution other than smart power generating units and power consuming units are energy storage units. Here the electrical car with its large battery e.g. at 20-50 kWh is very interesting. The electrical car is likely to gain more and more popularity because of its excellent efficiency, zero emission and possible use of renewable energy sources.

Most cars are only used a few hours a day and an electrical car can often be connected to the power grid via the battery charger when not in use. At least the car can be connected during the night if there are no access to charging facilities e.g. at the owners work place during the day. But it is very important, that charging of a high number of car batteries is coordinated in relation to the generation/load situation on the grid.

In particular at the end of the day the battery can be connected to the battery charger and the only requirement is often that the battery is either fully or partly (to a defined level) charged at a certain time in the following morning. By means of different methods it can be ensured that the charging is done at least at a time when the general load on the power grid is low.

However as an advanced Smart Grid solution more advanced control methods is likely to be required for control of the interaction between the power grid and the electrical car batteries. Data communication and control of the battery chargers by the power grid operator is an option, that would allow the power grid operator to control the battery charging time as long as the battery is charged at a time selected by the car owner.

The use of a combined car battery charger and grid inverter including electronic control of charging and discharging of the car battery in combination with a data communication and control link to the power grid operator could give a lot of new opportunities for maintaining the power grid balance on a Smart Grid when a large amount of electrical cars with this equipment is connected to the power grid. The car battery charger can become a key element in balancing the grid in a smart and economic way. A relative large number of such advanced battery chargers and electrical vehicles would add a very attractive energy storage facility to the power grid.

The use of battery chargers and electric car batteries as a reversible energy storage facility in relation to the power grid has already been described in various papers. However the invention relates to more specific features that could be of importance for the overall grid performance of the car battery charging systems as their connected capacity potentially could be significant compared to the total grid capacity.

BRIEF DESCRIPTION OF THE DRAWING

Further features and advantages of the invention are produced from the description of exemplary embodiments with reference to the drawing. FIG. 1 shows an example of the power interchange system.

DETAILED DESCRIPTION OF THE INVENTION

An exemplary embodiment of the invention includes a single or three phase grid transformer, a power electronic device for conversion of AC grid current to DC current. The current flow is reversible meaning that the power electronic device can act as a rectifier when active power is consumed from the grid to charge the battery. Alternatively the electronic power device can act as an inverter when active power is released by discharging the battery, inverted into AC current and fed into the grid.

The exemplary embodiment of the invention also includes electronic control device for control of charging and discharging of the car battery and electronic control device for phase angle control on the current and voltage at the grid side of the power electronic device. The phase angle control may work in both directions of power flow to allow so called four quadrant operation of the system.

A grid measuring device measures the current, voltage, frequency and phase angle between the power electronic device and the grid.

As a response to a change in the power grid frequency from the nominal frequency, the unit may modulate the actual active power flow in order to contribute to counteracting a frequency deviation similar to frequency governors on conventional power plants.

As a response to deviation from a predefined target voltage the unit may modulate the actual reactive power in order to contribute to voltage control for maintenance of the local voltage. Alternatively the unit may be set up to operate at a certain power factor or with a certain reactive power exchange.

When the unit is operating in inverter mode the control device may be set up to maintain operation during a short dip in the power grid voltage e.g. up to 3 seconds. This so called fault ride through capability is often required by larger generation systems in order to maintain the system balance after fault clearance in the power grid.

A data communication link for exchange of data and remote control of the unit may be included.

Referring generally to FIG. 1 an exemplary embodiment of the invention includes a power interchange system in form of a battery charging system comprising of at least one power electronic unit or power converter unit 5, operable to supply electrical power from a utility power grid 1 to an electrical rechargeable DC battery 7. In a preferred embodiment of the invention the power electronic unit or power converter unit 5 is also operable to supply electrical power from the electrical battery 7 to the utility power grid 1. in a reversed power flow. The power converter unit 5 may be interfaced to the power grid 1 using a power transformer 3 for AC-AC voltage transformation.

A grid measurement device 11 is connected between the reversible power converter 5 and the grid 1 in order to measure the current and power exchanged between the power converter and the grid. The grid measurement device 11 may also measure voltage, frequency and phase angle between current and voltage. The output of the grid measurement device 20 is connected to a grid response controller 21 that is arranged for adjusting the active and reactive power flow between the power converter 5 and the power grid 1. The grid response controller 21 is in one embodiment of the invention an integrated part of an internal controller for the reversible battery charger and such as an internal unit controller or the like. In another embodiment the controller is an external grid response controller using means of communication between the grid response controller and the battery charger unit. The battery charger unit is configured to provide active and reactive current and power to the power grid 1 as a function of the output of the grid measurement device 20 and in this way contributing to the stabilization of the grid frequency and voltage in case of imbalance.

In an embodiment of the invention a battery measurement device 14 is connected between the reversible power converter 5 and the electrical battery 7 in order to measure the battery 7 voltage and the current between the power converter 5 and the battery 7. The output of the battery measurement device 25 is connected to a battery charging/discharging controller 26, that is arranged for control of the battery 7 charging and discharging current.

The battery charging/discharging controller 26 shall ensure, that the battery 7 charging and discharging is limited as a function of the battery 7 voltage in order to protect the battery 7 against over and under voltage.

A power converter controller 23 is controlling the active and reactive power flow and direction of the power electronic unit 5 by means of active and reactive current or power reference set points 12 sent to the power electronic unit 5.

In an embodiment of the invention the output 24 of the battery charging/discharging controller 26 is connected to the power converter controller 23. The battery charging/discharging controller 26 is via the battery measurement device 14 monitoring the battery 7 condition in charging mode and/or in discharging mode. The purpose of the battery 7 charging/discharging controller 26 is to provide a charging and/or discharging limit i.e. a reference set point reduction to the converter controller 23 depending on the condition of the battery 7. This control feature shall protect the battery 7 against being over charged and/or being discharged below a certain level.

In an embodiment of the invention the grid response controller 21 connected to the grid measurement device 20 is set up to monitor the grid parameters via the grid measurement device 11 and in particular react to deviations in voltage and frequency on the power grid 1 from preset or nominal values.

As a response to a change in the power grid 1 frequency from the nominal or preset frequency, the grid response controller 21 may modulate the actual active power flow e.g. by sending a delta power reference via the output 22 to the power converter controller 23 in order to contribute to counteracting a frequency deviation similar to frequency governors on conventional power plants.

As a response to deviation from a predefined target voltage on the power grid 1 voltage the grid response controller 21 may modulate the actual reactive power e.g. by sending a delta voltage or reactive current or power reference via the output 22 to the power converter controller 23 in order to contribute to voltage control for maintenance of the power grid 1 voltage.

Alternatively the grid response controller 21 may be set up to control a certain power factor or a certain reactive power exchange e.g. by sending a delta voltage or reactive current or power reference via the output 22 to the power converter controller 23.

When the battery charging unit is operating in inverter mode it acts on the power grid as a generating unit. In inverter mode the grid response controller 21 may be set up to maintain operation during a short dip in the power grid 1 voltage e.g. up to 3 seconds. In this mode the grid response controller 21 may send active and/or reactive current or power reference set points via the output 22 to the power converter controller 23. The grid response controller 21 calculates the active and/or reactive current or power reference set points during the voltage dip as a function of the power grid 1 voltage continuously measured by the grid measurement device 11 e.g. by means of a predefined look up table for the relation between power grid 1 voltage and active and/or reactive current or power flow between the power electronic unit 5 and the grid 1 for dips in the power grid 1 voltage below a certain threshold level. This so called fault ride through capability is often required by larger generation systems in order to maintain the system balance after fault clearance in the power grid.

In an embodiment of the invention a data communication link 30 for remote monitoring and control of the battery 7 charging unit is connected to the power converter controller 23. The data communication link may use telephone, internet or other types of communication systems for communication between the battery charging unit and the remote control center 31 e.g. the power grid operator. The data communication link 30 may make certain information on the battery 7 charging unit available for the remote control center 31. An example of data information from the battery 7 charging unit to the remote control center 31 is:

Maximum charging power [kW];
Maximum discharging power [kW];
Maximum charging capacity [kWh;
Actual charging level [0-100%];
Time and date for charging complete [time and date];
At what charging level shall charging be completed? [0-100%];
Frequency response settings (dead band, droop, etc.);
Voltage/reactive power control settings (target, dead band, droop etc.).

The data communication link 30 may also facilitate remote control by the remote control center 31. An example of control commands from the remote control center 31 to the battery 7 charging unit are:
Remote control enable/disable;
Charging power reference [kW];
Discharging power reference [kW];
Frequency response settings (dead band, droop, etc.);
Voltage/reactive power control settings (target, dead band, droop etc.).

Based on the data information available by the data communication link 30 for the remote control center 31 e.g. the power grid operator, the remote control center 31 is able to utilize the battery 7 charging unit for participation in the power grid 1 balancing within certain limits, mainly the specified time and date for completing the charging.

The data communication link 30 for remote monitoring and control by the remote control center 31 may be utilized for manual or automatic monitoring and control by the remote control center 31.

In a preferred embodiment of the invention the remote control center 31, e.g. the power grid operator can monitor and alter the frequency response settings and/or the voltage/reactive power control settings of the battery 7 charging unit in order to ensure that adequate power grid 1 response settings are active.

In an embodiment of the invention the power converter controller 23 is connected to the power electronic unit 5, the battery 7 charging/discharging controller 26, the grid response controller 21 and the data communication link 30. The power converter controller 23 calculates the active and reactive current or power reference set points to the power electronic unit 5. The inputs from the battery 7 charging/discharging controller 26, the grid response controller 21 and the data communication link 30 may in a preferred embodiment of the invention be processed in an order of priority by the power converter controller 23 in order to provide power grid 1 disturbance response as requested by the grid response controller 21, provide protection of the battery 7 as requested by battery charging/discharging controller 26 and control the battery 7 charging/discharging as requested by the remote control center 31. The order of priority can be set up in different ways but a typical order may be:
1. Provision of power grid 1 disturbance response;
2. Protection of the battery 7;
3. Execute battery 7 charging/discharging as requested by the operator.

The invention claimed is:

1. A power interchange system for interchanging electric energy between a battery and an electric grid, the interchange system comprising:
   a rectifier unit for converting alternating current of the electric grid into direct current for charging the battery;
   a grid measurement device for measuring an electric parameter of the electric grid;
   a controller unit for adjusting the direct current for charging the battery as a function of the electric parameter of the electric grid, and
   a grid response controller which calculates active and/or reactive current or power reference set points during dips in the electric grid voltage,
   wherein the set points are calculated as a function of a predefined look up table for the relation between the electric grid voltage and the active and/or reactive current or a power flow between the rectifier unit and the electric grid when the electric grid voltage dips below a predetermined threshold level,
   wherein the set points are used to maintain operation of a battery charging unit in an inverter mode as a generating unit during the electric grid voltage dips,
   wherein the power interchange system is monitored and controlled from a remote location, and
   wherein inputs from a battery charging/discharging controller, the grid response controller, and a data communication link are processed in an order of priority by the controller unit in order to provide electric grid disturbance response as requested by the grid response controller, to provide protection of the battery as requested by the battery charging/discharging controller, and to control the battery charging/discharging.

2. The power interchange system according to claim 1, wherein the electric parameter of the electric grid is selected from the group consisting of current, voltage and frequency of the electric grid.

3. The power interchange system according to claim 1, wherein the controller unit is configured such that a predefined direct current for charging or discharging the battery is provided as a function of the electric parameter.

4. The power interchange system according to claim 1, wherein the controller unit is configured such that a local power grid disturbance within the electric grid is detected and power grid support is provided.

5. The power interchange system according to claim 1, wherein the controller unit is configured such that a local power grid disturbance within the electric grid is detected or power grid support is provided.

6. The power interchange system according to claim 1, further comprising a main current circuit, which is selected from the group consisting of a single phase circuit, a two phase circuit and a three phase circuit.

7. The power interchange system according to claim 1, further comprising an inverter unit for converting direct current of the battery into alternating current for supplying the electric grid with the alternating current.

8. The power interchange system according to claim 1, wherein the grid measurement device and the controller unit are physically separated from the electric grid and from the battery.

9. The power interchange system according to claim 1, wherein the grid measurement device or the controller unit are physically separated from the electric grid or from the battery.

10. The power interchange system according to claim 1, wherein the power interchange system is monitored or controlled from a remote location.

11. The power interchange system according to claim 1, wherein the battery is selected from the group consisting of battery for a vehicle, flow battery and electrochemical battery.

12. An arrangement of at least two of the power interchange systems,
   wherein each power interchange system, comprises:
      a rectifier unit for converting alternating current of the electric grid into direct current for charging the battery,
      a grid measurement device for measuring an electric parameter of the electric grid,
      a controller unit for adjusting the direct current for the charging the battery as a function of the electric parameter of the electric grid, and
      a grid response controller which calculates active and/or reactive current or power reference set points during dips in the electric grid voltage,
   wherein the power interchange systems can be operated in parallel, wherein the set points are calculated as a function of a predefined look up table for the relation between the electric grid voltage and the active and/or reactive current or a power flow between the rectifier unit and the electric grid when the electric grid voltage dips below a predetermined threshold level, wherein the set points are used to maintain operation of a battery charging unit in an inverter mode as a generating unit during the electric grid voltage dips, wherein the power interchange systems are monitored and controlled from a remote location, and wherein inputs from a battery charging/discharging controller, the grid response controller, and a data communication link are processed in an order of priority by the controller unit in order to provide electric grid disturbance response as requested by the grid response controller, to provide protection of the battery as requested by the battery charging/discharging controller, and to control the battery charging/discharging.

13. The arrangement according to claim 12, wherein the electric parameter of the electric grid is selected from the group consisting of current, voltage and frequency of the electric grid.

14. The arrangement according to claim 12, wherein the controller unit is configured such that a predefined direct current for charging or discharging the battery is provided as a function of the electric parameter.

15. The arrangement according to claim 12, wherein the controller unit is configured such that a local power grid disturbance within the electric grid is detected and power grid support is provided.

16. The arrangement according to claim 12, wherein the controller unit is configured such that a local power grid disturbance within the electric grid is detected or power grid support is provided.

17. A method for interchanging electric energy between a battery and an electric grid by operating a power interchange system, the method comprising:

providing the power interchange system, the battery and an electric grid, wherein the battery and the electric grid are interconnected such that electric energy is interchanged between the battery and the electric grid;

measuring an electric parameter of the electric grid using a grid measurement device of the power interchange system;

adjusting direct current for charging the battery as a function of the electric parameter of the electric grid using a controller unit of the power interchange system, converting alternating current of the electric grid into the direct current for charging the battery using a rectifier unit of the power interchange system, charging the battery using the direct current, and calculating active and/or reactive current or power reference set points during dips in the electric grid voltage below a predetermined threshold level, wherein the set points are calculated as a function of a predefined look up table for the relation between the electric grid voltage and the active and/or reactive current or a power flow between the rectifier unit and the electric grid when the electric grid voltage dips below the predetermined threshold level, using the set points to maintain operation of a battery charging unit in an inverter mode as a generating unit during the electric grid voltage dips, wherein the power interchange system is monitored and controlled from a remote location, and processing inputs from a battery charging/discharging controller, the grid response controller, and a data communication link in an order of priority by the controller unit in order to provide electric grid disturbance response as requested by the grid response controller, to provide protection of the battery as requested by the battery charging/discharging controller, and to control the battery charging/discharging.

18. The method according to claim 17, wherein the measuring, the adjusting, the converting and/or the charging are executed simultaneously.

19. The method according to claim 17, wherein the battery is selected from the group consisting of battery for a vehicle, flow battery and electrochemical battery.

* * * * *